United States Patent
Radomile et al.

(10) Patent No.: US 7,028,385 B2
(45) Date of Patent: Apr. 18, 2006

(54) METHOD FOR IMPROVED DISTRIBUTION OF COOLING AIR IN AN ELECTRIC MACHINE

(75) Inventors: Michael Camillo Radomile, Erie, PA (US); Peter Gerard Kloecker, Erie, PA (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 10/206,701

(22) Filed: Jul. 26, 2002

(65) Prior Publication Data

US 2002/0185922 A1    Dec. 12, 2002

Related U.S. Application Data

(63) Continuation-in-part of application No. 09/777,758, filed on Feb. 6, 2001, now abandoned.

(51) Int. Cl.
*H02K 15/00* (2006.01)
*H02K 15/14* (2006.01)
*H02K 15/16* (2006.01)

(52) U.S. Cl. .............. 29/596; 29/557; 29/597; 29/598; 29/609; 310/59; 310/61; 310/214; 310/227

(58) Field of Classification Search ............ 29/596, 29/557, 597, 598, 609; 310/59, 61, 214, 310/227

See application file for complete search history.

(56) References Cited

U.S. PATENT DOCUMENTS

| | | | |
|---|---|---|---|
| 2,043,655 A | 6/1936 | Ehrmann | |
| 3,558,943 A | 1/1971 | Nilsson | |
| 3,643,119 A | 2/1972 | Lukens | |
| 3,650,022 A * | 3/1972 | Stone | 29/598 |
| 3,731,121 A | 5/1973 | Cook et al. | |
| 4,020,373 A | 4/1977 | Yamamoto et al. | |
| 4,352,034 A | 9/1982 | Karhan et al. | |
| 4,456,842 A | 6/1984 | Tachibana | |
| 4,513,217 A | 4/1985 | Kishimoto | |
| 5,140,740 A * | 8/1992 | Weigelt | 29/596 |
| 5,214,324 A | 5/1993 | Holmes | |
| 5,214,325 A | 5/1993 | Matson et al. | |
| 5,652,469 A | 7/1997 | Boardman et al. | |
| 5,698,924 A | 12/1997 | Nishida | |
| 5,705,865 A | 1/1998 | Ishida et al. | |
| 5,869,912 A | 2/1999 | Andrew et al. | |
| 5,892,307 A | 4/1999 | Pavlovich et al. | |
| 6,157,110 A | 12/2000 | Strobl | |
| 6,504,274 B1 * | 1/2003 | Bunker et al. | 310/64 |

* cited by examiner

*Primary Examiner*—A. Dexter Tugbang
*Assistant Examiner*—Tim Phan
(74) *Attorney, Agent, or Firm*—Carlos L. Hanze; David G. Maire; Beusse Wolter Sanks Mora & Maire, P.A.

(57) ABSTRACT

Method for retrofitting an electric machine to reduce temperature rise therein. The method allows for removing at least a portion of an originally assembled coil support on a spider structure of the machine. The originally assembled coil support is configured to allow only axial flow to cooling air from a plurality of cooling vents in the armature of the machine. The method further allows for mounting a new coil support on the spider structure. The new coil support is configured to provide axial and radial routing to cooling air passing from the plurality of cooling vents. The air routed radially by the new coil support passes proximate the coil end turns and enables a reduction of temperature rise in the machine.

6 Claims, 4 Drawing Sheets

METHOD FOR IMPROVED DISTRIBUTION OF COOLING AIR IN AN ELECTRIC MACHINE

This application is a continuation-in-part which claims benefit of the Feb. 6, 2001, filing date of application Ser. No. 09/777,758 now abandoned.

BACKGROUND OF THE INVENTION

The present invention is generally related to a method for ventilating electric machines, and, more particularly, to a method for improved distribution of cooling air to lower operating temperature of the machine.

Dynamo electric machines, such as motors, generators, etc., generate heat which must be removed efficiently to ensure long and economical operation of the machine. As shown in the exemplary prior art construction of FIG. 1, in an electric machine 10, such as a direct current (DC) traction motor, a suitable external blower 12 is commonly used to cool the machine by forcing a cooling fluid such as air from one end of the armature 14 of the machine through a plurality of venting passages therein, e.g., venting passage 16, to an opposite end. The armature 14 functions as a core and provides support for electrical coils 17 having end turns 19 projecting beyond the ends of the armature 14. The armature 14 is formed of a plurality of laminations (not shown) that are held together by an axial compressive load exerted on the armature 14 by a coil support 18 mounted on a spider structure 20, which is in turn mounted on the shaft 22 of the machine. In some embodiments, the spider 20 and coil support 18 may be formed as an integral unit. The coil support 18 includes a cooling passage 21 for passage of cooling fluid from the armature 14 away from the electrical coils 17 in the axial direction. Unfortunately, there may be regions of the end turns 19, e.g., the region proximate to flange 24, that are not cooled as well as other regions of the machine. This causes undesirable temperature rises in the machine and can result in overheating, and/or shorter insulation life. Either of such results would add burdensome costs to the operation of the machine. For this reason, there is a need for a method for cooling otherwise isolated parts of the machine.

It would be further desirable to provide a method that may be inexpensively provided to retrofit machines already deployed in the field without compromising the structural integrity of the machines, particularly the pre-loaded armature lamination stack, and without having to use complicated tooling equipment or labor intensive assembly.

SUMMARY OF THE INVENTION

Generally speaking, the present invention fulfills the foregoing needs by providing in one aspect thereof a method for retrofitting an electric machine to reduce temperature rise therein. The method allows for removing an originally assembled coil support on a spider structure of the machine. The originally assembled coil support is configured to allow axial flow to cooling air from a plurality of cooling vents in the armature of the machine. The method further allows for mounting a new coil support. The new coil support is configured to provide axial and radial routing to cooling air passing from the plurality of cooling vents. The air routing provided by that new coil support enables reduction of temperature rise.

Figure 1:
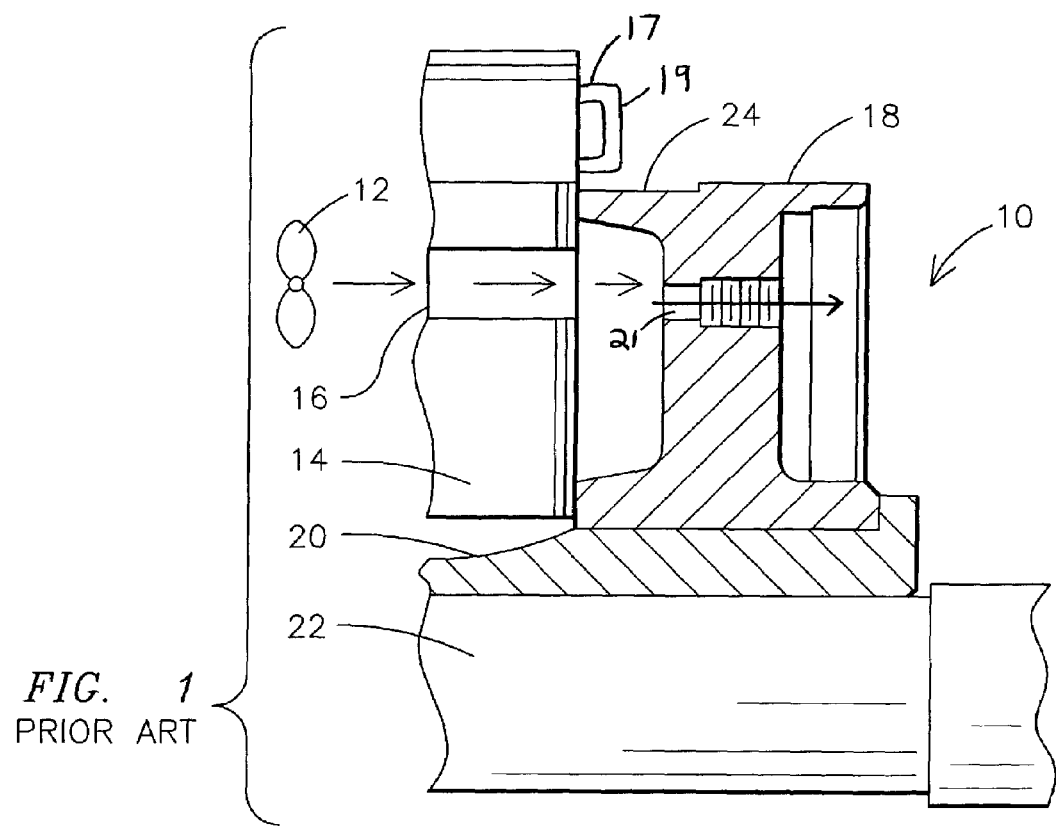
FIG. 1 is a cross-sectional view of a prior art arrangement of an originally assembled coil support used in an exemplary dynamo electric machine and wherein that arrangement does not provide radial flow to cooling air passing therethrough.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 2:
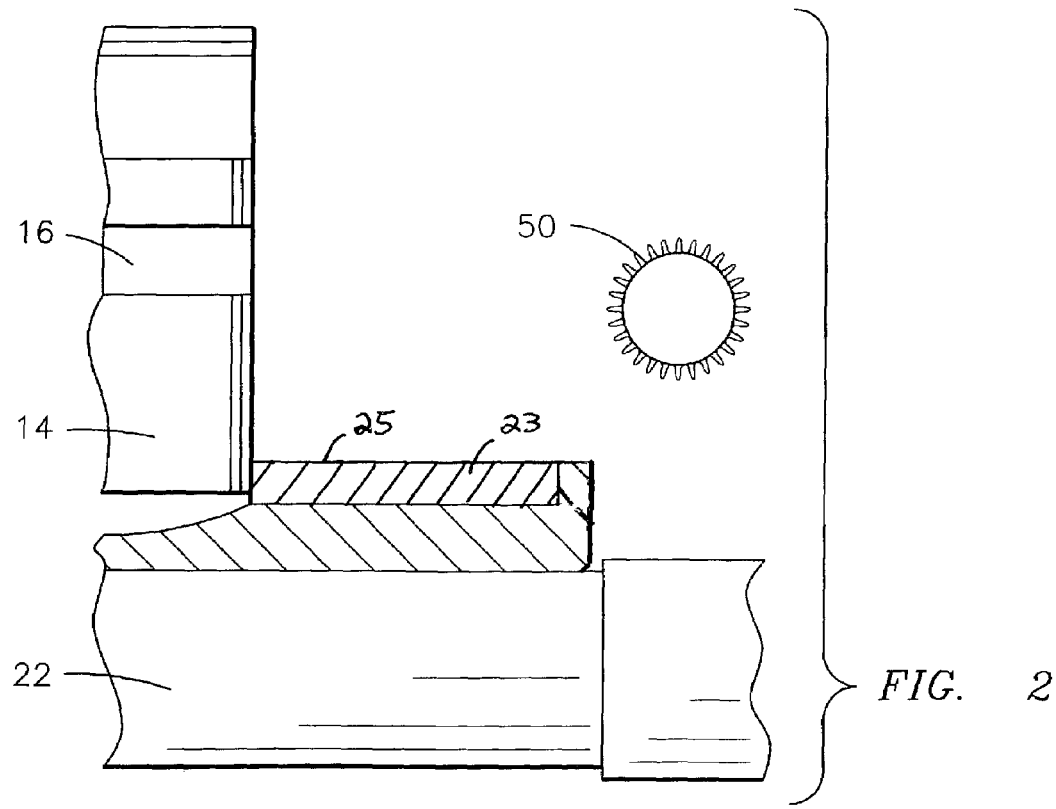
FIG. 2 illustrates the arrangement of FIG. 1 with the originally assembled coil support removed.

FIG. 2 is used for illustrating structure that results upon performing exemplary steps that allow for retrofitting a dynamo electric machine to reduce temperature rise in the machine. As shown in FIG. 2, a tool 50, such as a standard machining tool, is configured to remove at least a portion of the originally assembled coil support 18 (FIG. 1) on spider 20. As suggested above, the originally assembled coil support 18 is configured with cooling passage 21 to allow only axial flow to the cooling air from the plurality of cooling vents, e.g., cooling vent 16, in the armature 14 of the machine. As further explained below, the removal of the originally assembled coil support allows for mounting a replacement coil support on the spider 20 that is configured to provide both axial and radial routing to cooling air passing from the plurality of cooling vents. The air routing provided by the new coil support is believed to enable temperature rise reduction in the machine by improved cooling of the outer ends of the armature 14 and the coils 17.

Figure 3:
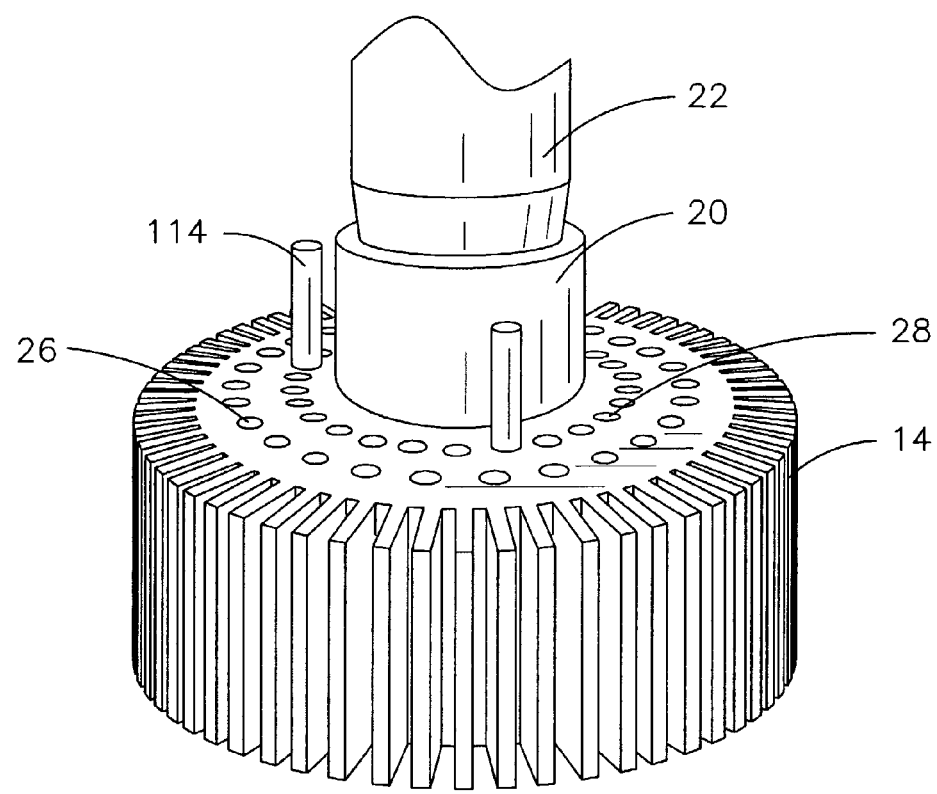
FIG. 3 illustrates an isometric view of the arrangement shown in FIG. 2.
Figure 4:
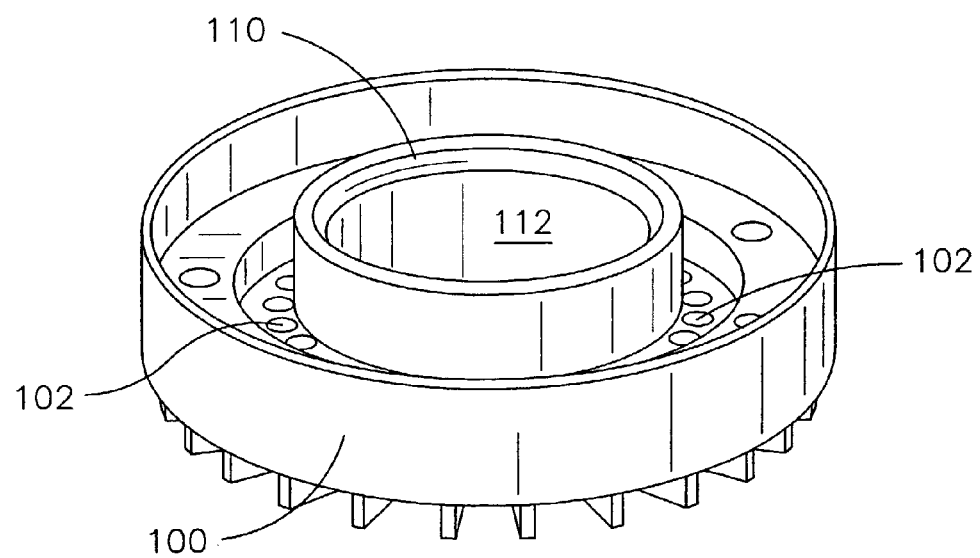
FIG. 4 illustrates an isometric view of a new coil support.

FIG. 3 shows an isometric view of the dynamo electric machine subsequent to the removal of at least a portion of the originally assembled coil support 18. In one exemplary embodiment, the removal of coil support 18 is performed by machining off, e.g., by cutting or milling, at least a portion of coil support 18 from spider 20 to provide on spider 20 a cylindrical surface 25 configured to receive a replacement coil support 100, as shown in various levels of details in FIGS. 4 through 7. As shown in FIG. 3, the plurality of cooling vents or passages in the armature of the machine is arranged to provide respective inner and outer circles of cooling vents. For example, cooling vent 26 is part of the outer circle of cooling vents and cooling vent 28 is part of the inner circle of cooling vents. As described in greater detail below, the new coil support 100 is configured so that air flow from the outer circle of cooling vents is radially deflected by an annular chamber 104 (FIG. 7) in the new coil support.

Air flow from the inner circle of cooling vents is allowed to axially continue through corresponding openings, e.g., axial openings 102 (FIG. 4), provided in new coil support 100. The mounting of the new coil support onto the remaining portion 23 of the original coil support 18 may be accomplished by suitably heating the new coil support 100 in order to thermally expand a hub 110 and provide sufficient clearance between a central bore 112 defined by hub 110 and the receiving surface on the remaining portion 23 of the original coil support. As show in FIGS. 3 and 5, alignment pins 114 may be used for appropriately aligning new coil support 100 relative to the armature slots. Once the new coil support 100 is mounted on spider 20, and upon cooling off of the new coil support, the diameter of the central bore 112 contracts to provide a sufficiently tight interference fit between the hub 110 and the receiving surface on the spider. The heating action may be performed with any standard heating tool.

Figure 5:
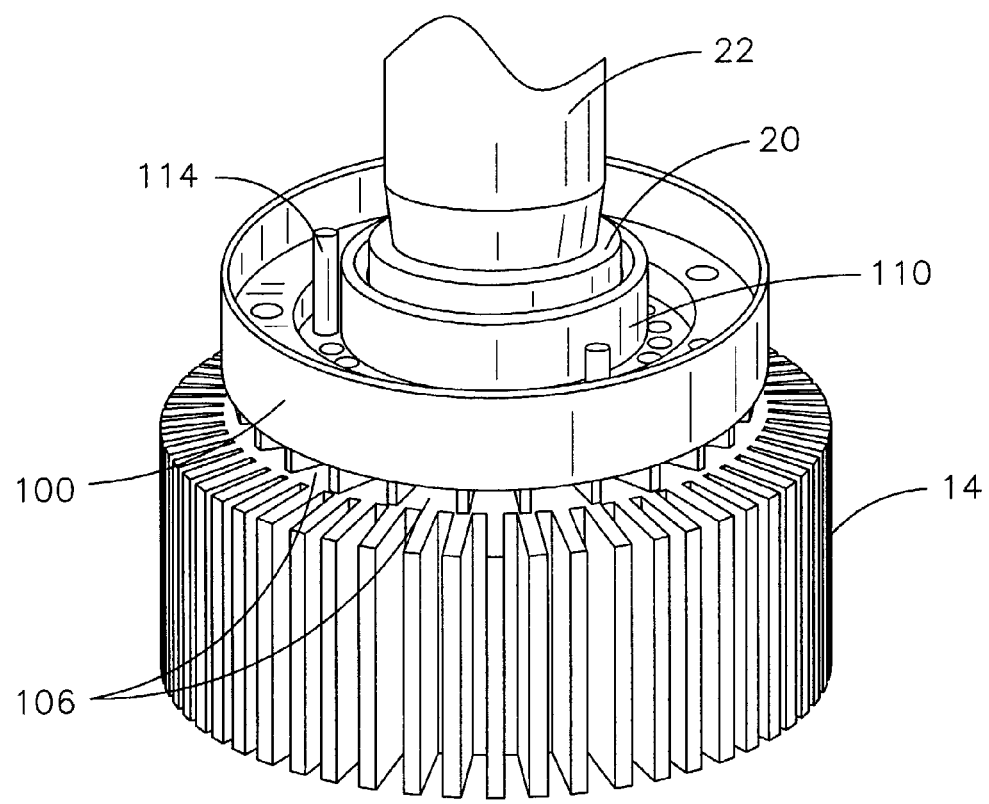
FIG. 5 illustrates an isometric view of the new coil support assembled onto a spider structure of the machine.
Figure 6:
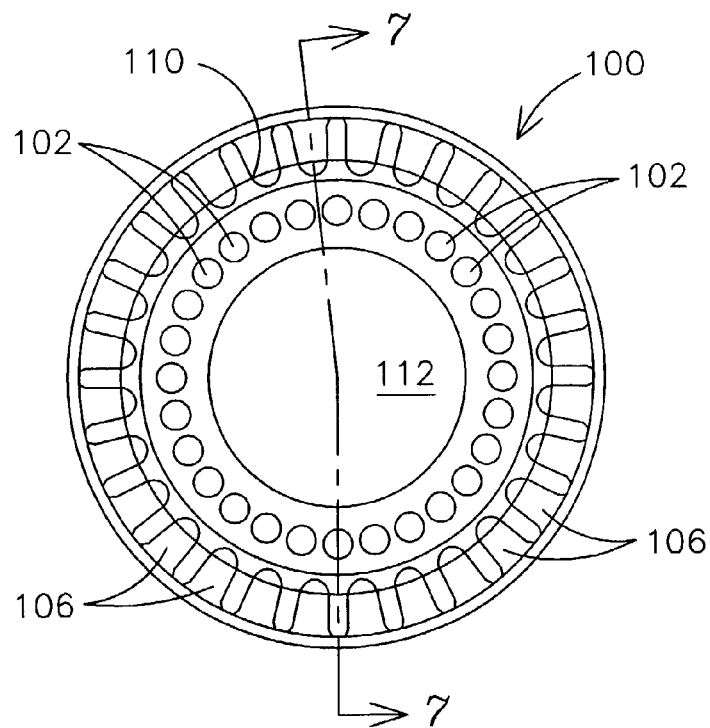
FIGS. 6 and 7 illustrate further details regarding the new coil support shown in FIG. 4.
Figure 7:
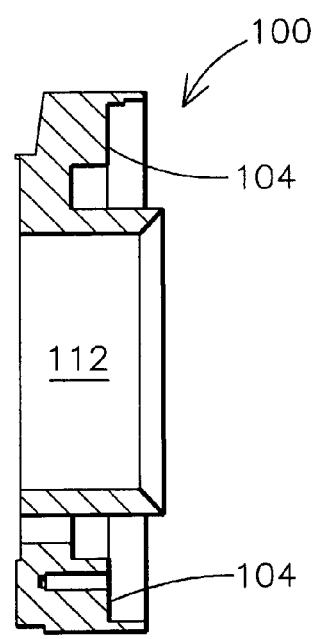

FIG. 6 illustrates a top view of new coil support 100 and FIG. 7 illustrates a cross sectional view along a line 7—7 shown in FIG. 7. As suggested above, the annular chamber 104 allows to radially route the cooling air from the outer circle of cooling vents, and eventually that routed air exits from new coil support 100 through a plurality of radial openings 106 (FIG. 5) between the armature and the new coil support. For simplicity of illustration, not every radial or axial opening in new coil support 100, as illustrated in FIGS. 5 and 6, has been associated with a reference numeral.

The method of modifying motor 10 that is described above is accomplished without necessitating the re-stacking of the laminations forming armature 14. The original coil support 18 imparts a compressive axial load to a radially inner portion of the armature 14 and also imparts a compressive axial load to a radially outer portion of the armature 14. The portion of the original coil support that is removed includes the cooling passage 21. The removal of this portion of the armature 14 will relax the compressive load imparted to the radially outer portion of the armature without relaxing the compressive load imparted to the radially inner portion of the armature, thereby preserving the integrity of the armature stack. This is accomplished by removing all but a shoulder portion 23 of the original coil support 18 to maintain the compressive load imparted to the radially inner portion of the armature 14. In the embodiment of a locomotive traction motor, the shoulder portion 23 may have a remaining thickness dimension engaging the radially inner portion of the armature 14 of approximately 0.31 inches.

The replacement coil support 100 is formed to have an axial cooling passage 102 and a radial cooling passage that includes the annular chamber 104 and the radial openings 106. The heated replacement coil support 100 is installed onto the remaining portion 23 of the original coil support in position to align the axial cooling passage 102 to receive cooling fluid from the armature inner cooling passages 28 for passage of cooling fluid away from the electrical coils 17 in the axial direction and to align the radial cooling passage 104, 106 to receive cooling fluid from the armature outer cooling passages 26 for passage of cooling fluid in a radial direction proximate the end turns 19 of the electrical coils 17. The heated replacement coil support 100 and the armature 14 are urged together in a press to impart a compressive axial load to the radially outer portion of the armature 14 while the replacement coil support 100 cools to ambient temperature to form a shrink fit onto the remaining portion 23 of the original coil support 18. The compressive load imposed in this manner combines with the compressive load that exists between the remaining portion 23 of the original coil support and the radially inner portion of the armature 14. In one embodiment for a locomotive traction motor the press is used to apply a load of approximately 60 tons. One or more tack welds (not shown) may be formed between the replacement coil support 100 and the remaining portion 23 of the original coil support while the replacement coil support and the armature are still in the press. A full penetration weld may be formed there between once the apparatus is removed from the press. The weld works with the shrink-fit to restrain the armature laminations during operation of the modified machine.

Figure 8:
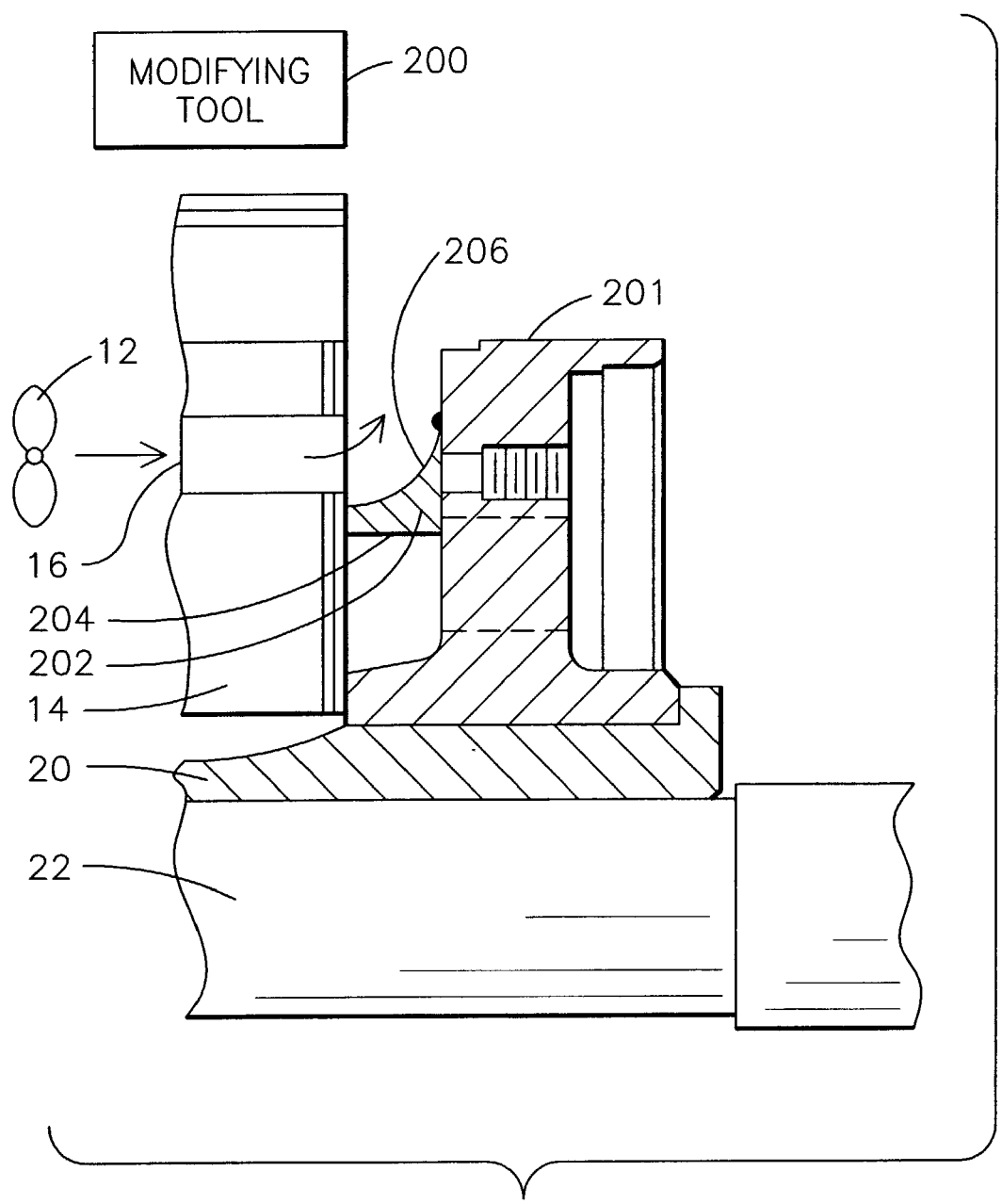
FIG. 8 illustrates the arrangement of FIG. 1 with the originally assembled coil support being modified.

FIG. 8 illustrates another embodiment of the present invention that uses a modifying tool 200 for modifying the originally assembled coil support 18 (FIG. 1) in lieu of removing such coil support from spider 20. As shown in FIG. 8, modifying tool 200 may include a standard cutting or machining tool that allows for removing outer flange 24 (FIG. 1) without affecting any other components of the dynamo electric machine. As suggested above, the modified coil support 201 provides axial and axial routing to cooling air that passes from the plurality of cooling vents in the armature of the machine. The new routing provided to the cooling air by the modified coil support enables temperature rise reduction in the electric machine. Modifying tool 200 may further include a standard affixing tool, such as welding tool, that allows for affixing a ring 202 positioned between the armature 14 and the modified coil support 201. In this embodiment, air flow from the outer circle of cooling vent is radially reflected by an outer wall 206 of ring 202 to the space previously closed by the outer flange 24 (FIG. 1). As shown in FIG. 8, the shape of outer wall 206 is concave relative to the air flow from the outer circle of vents and allows for imparting approximately a 90 degree deflection to that air flow. Conversely, air flow from the inner circle of cooling vent continues axially unimpeded by way of a cylindrical inner wall 204 in the ring 202. Experimentally derived data indicates that the kit and method of the present invention allow for reducing armature temperature rise by approximately 10% in one exemplary DC traction motor type.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for retrofitting an electric machine to reduce temperature rise therein, said method comprising:
   removing an originally assembled coil support on a spider structure of the machine, said originally assembled coil support configured to allow an axial flow to cooling air from a plurality of cooling vents in an armature of the machine; and
   mounting a new coil support on said spider structure, said new coil support configured to provide an axial and radial routing to cooling air passing from said plurality of cooling vents, the air routing provided by said new coil support enabling said temperature rise reduction.

2. The retrofitting method of claim 1, wherein said removing step comprises machining the originally assembled coil support to provide on said spider structure a cylindrical surface configured to receive the new coil support.

3. The retrofitting method of claim 2 wherein the plurality of cooling vents is arranged on said armature to provide respective inner and outer circles of cooling veins and wherein air flow from said outer circle of cooling vents is radially deflected by an annular chamber in said new coil support.

4. The retrofitting method of claim 3 wherein air flow from said inner circle of cooling vents is allowed to axially continue through corresponding openings in said new coil support.

5. The retrofitting method of claim 4 further comprising heating said new coil support to provide sufficient clearance between a central bore in said new coil support and the receiving cylindrical surface on the spider structure.

6. The retrofitting method of claim 5 wherein upon cooling of said new coil support an interference fit is provided between said bore and said receiving surface on the spider structure.

\* \* \* \* \*